United States Patent
Ren et al.

(10) Patent No.: US 10,708,888 B2
(45) Date of Patent: Jul. 7, 2020

(54) UPLINK DETECTION METHOD AND DEVICE IN NON-ORTHOGONAL MULTIPLE ACCESS SYSTEM, AND BASE STATION

(71) Applicant: CHINA ACADEMY OF TELECOMMUNICATIONS TECHNOLOGY, Beijing (CN)

(72) Inventors: Bin Ren, Beijing (CN); Shaoli Kang, Beijing (CN); Hao Liu, Beijing (CN); Yang Song, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 61 days.

(21) Appl. No.: 15/750,826

(22) PCT Filed: Jul. 29, 2016

(86) PCT No.: PCT/CN2016/092320
§ 371 (c)(1),
(2) Date: Feb. 6, 2018

(87) PCT Pub. No.: WO2017/024950
PCT Pub. Date: Feb. 16, 2017

(65) Prior Publication Data
US 2018/0234948 A1    Aug. 16, 2018

(30) Foreign Application Priority Data
Aug. 10, 2015   (CN) .......................... 2015 1 0487947

(51) Int. Cl.
*H04B 7/04*    (2017.01)
*H04W 72/12*   (2009.01)
(Continued)

(52) U.S. Cl.
CPC ............. *H04W 72/04* (2013.01); *H04J 15/00* (2013.01); *H04L 5/0048* (2013.01);
(Continued)

(58) Field of Classification Search
CPC . H04W 72/04; H04W 64/00; H04W 72/1278; H04W 52/18; H04W 72/02;
(Continued)

(56) References Cited

U.S. PATENT DOCUMENTS

2003/0043887 A1* 3/2003 Hudson ................. H04L 1/0618
                                                         375/144
2014/0254544 A1* 9/2014 Kar Kin Au .......... H04L 5/0033
                                                         370/330
(Continued)

FOREIGN PATENT DOCUMENTS

CN    101730122 A    6/2010
CN    103517416 A    1/2014
(Continued)

OTHER PUBLICATIONS

International Preliminary Report on Patentability (IPRP; Ch. 1) for PCT/CN2016/092320, dated Feb. 22, 2018, and its English translation provided by WIPO.
(Continued)

*Primary Examiner* — Edan Orgad
*Assistant Examiner* — Vanneilian Lalchinthang
(74) *Attorney, Agent, or Firm* — Ladas & Parry, LLP (57) ABSTRACT

The present disclosure discloses an uplink detection method and device in a NOMA system. The method includes: performing pilot activation detection on each terminal in a first terminal set corresponding to a NOMA transmission unit block repeatedly until a detection end condition is met, wherein the first terminal set includes terminals that may transmit uplink data on the NOMA transmission unit block;
(Continued)

---

100 — pilot activation detection is repeated on each terminal in a first terminal set corresponding to a NOMA transmission unit block until a detection end condition is met, wherein the first terminal set includes terminals that may transmit uplink data on the NOMA transmission unit block 110 — on the time-frequency resource of the NOMA transmission unit block, a channel estimation is performed on each terminal in a second terminal set determined by detecting the pilot activation within each repetition period, wherein the second terminal set includes terminals that actually transmits uplink data on the NOMA transmission unit block 120 — a data channel is detected and decoded according to a channel estimation result of each terminal in the second terminal set within each repetition period and an uplink data signal on the time-frequency resource of the NOMA transmission unit block performing channel estimation on each terminal in a second terminal set that determined through the pilot activation detection within each repetition period, wherein the second terminal set includes terminals that have actually transmitted uplink data on the NOMA transmission unit block; and detecting and decoding a data channel of each terminal in the second terminal set within each repetition period.

8 Claims, 3 Drawing Sheets

(51) Int. Cl.
    *H04J 3/16*     (2006.01)
    *H04W 72/04*     (2009.01)
    *H04W 64/00*     (2009.01)
    *H04J 99/00*     (2009.01)
    *H04L 5/00*     (2006.01)
    *H04L 25/02*     (2006.01)
    *H04W 88/08*     (2009.01)
    *H04W 74/08*     (2009.01)

(52) U.S. Cl.
    CPC ......... *H04L 25/0224* (2013.01); *H04W 64/00* (2013.01); *H04W 74/08* (2013.01); *H04W 88/08* (2013.01)

(58) Field of Classification Search
    CPC ... H04W 72/08; H04W 84/042; H04W 16/32; H04W 88/08; H04J 15/00; H04J 3/1694; H04L 25/0224; H04L 5/0048; H04B 7/0617; H04B 7/0408
    USPC .......................................................... 370/330
    See application file for complete search history.

(56) References Cited

U.S. PATENT DOCUMENTS

| | | | | |
|---|---|---|---|---|
| 2014/0307594 A1* | 10/2014 | Marzetta | ............... | H04W 16/32 370/280 |
| 2014/0314006 A1* | 10/2014 | Suh | ...................... | H04B 7/0452 370/329 |
| 2015/0280879 A1 | 10/2015 | Zhao et al. | | |
| 2016/0029350 A1* | 1/2016 | Kishiyama | ............ | H04W 16/28 370/329 |
| 2016/0262181 A1* | 9/2016 | Lee | ........................ | H04B 7/04 |
| 2018/0146474 A1* | 5/2018 | Luo | ................... | H04W 72/0413 |
| 2018/0184432 A1* | 6/2018 | Ryoo | ................ | H04W 72/0473 |
| 2018/0192435 A1* | 7/2018 | Benjebbour | .......... | H04W 52/18 |

FOREIGN PATENT DOCUMENTS

| | | |
|---|---|---|
| CN | 104640220 A | 5/2015 |
| CN | 104754759 A | 7/2015 |
| CN | 105657861 A | 6/2016 |
| WO | 2014089832 A1 | 6/2014 |
| WO | 2014/135126 A1 | 9/2014 |

OTHER PUBLICATIONS

Written Opinion of the International Search Authority for PCT/CN2016/092320, dated Nov. 2, 2016, and its English translation provided by WIPO.

From EPO Application No. 16834574.2, Extended European Search Report and Search Opinion dated Jun. 25, 2018.

Bayesteh et al., "Blind Detection of SCMA for Uplink Grant-Fee Multiple-Access"; 2014 11$^{th}$ International Symposium on Wireless Communications Systems; IEEE; Aug. 26, 2014; pp. 853-857.

Zeng et al., "Maximum-Minimum Eigenvalue Detection for Cognitive Radio"; the 18$^{th}$ Annual IEEE International Symposium on Personal, Indoor and Mobile Radio Communications (PIMRC'07); Sep. 1, 2007; pp. 1-5.

International Search Report for PCT/CN2016/092320, dated Nov. 2, 2016, and its English translation provided by WIPO.

Written Opinion of the International Search Authority for PCT/CN2016/092320, dated Nov. 2, 2016, and its English translation provided by Bing.com Microsoft Translator.

First Office Action and search report from CN app. No. 201610204599.X, dated Dec. 28, 2018, with English translation from Global Dossier.

"Motivation for new WI on Light Connection in LTE", 3GPP TSG RAN Meeting #71, Goteborg, Sweden, Mar. 7-11, 2016.

* cited by examiner

UPLINK DETECTION METHOD AND DEVICE IN NON-ORTHOGONAL MULTIPLE ACCESS SYSTEM, AND BASE STATION

CROSS-REFERENCE TO RELATED APPLICATIONS

The present application is the U.S. national phase of PCT Application No. PCT/CN2016/092320 filed on Jul. 29, 2016, which claims priority to the Chinese Patent Application No. 201510487947.4 filed on Aug. 10, 2015, the disclosures of which are incorporated herein by reference in their entireties.

TECHNICAL FIELD

The present disclosure relates to the field of communication technology, in particular to an uplink detection method and device in a non-orthogonal multiple access system, and a base station.

BACKGROUND

In a fifth-generation mobile communication system (referred to as 5G), such a technical demand is proposed as a rate of gigabits per second (Gbps) for user experience, an ultrahigh flow density, an extra-large number of connections, an improved spectral efficiency, a reduced time delay, or the like.

In order to meet a requirement of 5G for the extra-large number of connections, a non-orthogonal multiple access technology is introduced.

As for a requirement to support a mobile Internet of Things (IoT) application scenario of 5G with a large number of connections, a low time delay and high reliability, when an uplink scheduling algorithm of a 4G system is still used, it needs a significant amount of control signaling, with relatively high signaling overhead. In the case that the number of connections reaches to a certain value, the number of scheduled users is limited by control channel resources. Therefore, as for the mobile IoT application, a scheduling-free mechanism should be utilized.

In a long term evolution (LTE) system, since a scheduling mechanism is adopted, a base station knows a transmission time and a position of an uplink pilot for each user, and accordingly performs uplink detection. However, in the case that a terminal employs a scheduling-free access mechanism, the base station does not know when the terminal transmits data. In this case, how a base station side performs the uplink detection is a problem to be solved currently.

SUMMARY

The present disclosure provides an uplink detection method and device in an non-orthogonal multiple access (NOMA) system, and a base station, to implement the uplink detection at the base station side in the case that the terminal accesses by using the scheduling-free mechanism, so as to meet the requirement for mass connections of the 5G mobile communication system.

The technical solution of the present disclosure is as below.

In one aspect, the present disclosure provides an uplink detection method in a NOMA system, including: performing pilot activation detection on each terminal in a first terminal set corresponding to an NOMA transmission unit block repeatedly until a detection end condition is met, wherein the first terminal set comprises terminals that may transmit uplink data on the NOMA transmission unit block, and the NOMA transmission unit block comprises all NOMA basic transmission units occupying a same time-frequency resource in a same NOMA pattern matrix; performing, on the time-frequency resource of the NOMA transmission unit block, channel estimation on each terminal in a second terminal set determined through the pilot activation detection within each repetition period, wherein the second terminal set comprises terminals that have actually transmitted the uplink data on the NOMA transmission unit block; and detecting and decoding a data channel according to a channel estimation result of each terminal in the second terminal set within each repetition period and an uplink data signal on the time-frequency resource of the NOMA transmission unit block.

Optionally, the detection end condition includes at least one of: that a number of repetition times of the pilot activation detection reaches a threshold number of repetition times; that the second terminal sets determined through the pilot activation detection within at least two repetition periods are the same; and that a relative difference ratio of pilot prior existence probabilities determined by detecting and decoding the data channel within at least two repetition periods is not greater than a predetermined relative difference ratio threshold.

Based on any of the above-mentioned method embodiments, optionally, the step of performing pilot activation detection on each terminal in a first terminal set corresponding to an NOMA transmission unit block includes: performing, based on pilot signal received power, the pilot activation detection on each terminal in the first terminal set corresponding to the NOMA transmission unit block.

Optionally, the step of performing, based on the pilot signal received power, the pilot activation detection on each terminal in the first terminal set corresponding to the NOMA transmission unit block includes: performing LS channel estimation on a pilot signal on the NOMA transmission unit block in a frequency domain, to obtain a frequency domain LS channel estimation value; converting the frequency domain LS channel estimation value to a time domain channel estimation value; determining a detection statistic value and a judgment threshold of interference noise power according to the time domain channel estimation value; and determining the second terminal set according to the detection statistic value and the judgment threshold of the interference noise power.

Optionally, the step of performing pilot activation detection on each terminal in a first terminal set corresponding to an NOMA transmission unit block may include: performing, based on a pilot-signal correlation, the pilot activation detection on each terminal in the first terminal set corresponding to the NOMA transmission unit block.

Optionally, the step of performing, based on a pilot-signal correlation, the pilot activation detection on each terminal in the first terminal set corresponding to the NOMA transmission unit block includes: determining an autocorrelation matrix of a pilot signal on each uplink subcarrier of the time-frequency resource of the NOMA transmission unit block; determining an average value of autocorrelation matrices of the pilot signals on all uplink subcarriers of the time-frequency resource of the NOMA transmission unit block; determining a maximum eigenvalue and a minimum eigenvalue of the average value; and determining the second terminal set according to the maximum eigenvalue and the minimum eigenvalue.

Based on any of the above-mentioned method embodiments, optionally, the terminals in the first terminal set include a terminal of an own cell and a terminal of an adjacent cell.

In another aspect, the present disclosure further provides an uplink detection device in a non-orthogonal multiple access (NOMA) system, including: a pilot activation detection module, configured to a pilot activation detection module, configured to perform pilot activation detection on each terminal in a first terminal set corresponding to an NOMA transmission unit block repeatedly until a detection end condition is met, wherein the first terminal set comprises terminals that may transmit uplink data on the NOMA transmission unit block, and the NOMA transmission unit block comprises all NOMA basic transmission units occupying a same time-frequency resource in a same NOMA pattern matrix; a channel estimation module, configured to perform, on the time-frequency resource of the NOMA transmission unit block, channel estimation on each terminal in a second terminal set determined through the pilot activation detection within each repetition period, wherein the second terminal set includes terminals that have actually transmitted the uplink data on the NOMA transmission unit block; and a data detection module, configured to detect and decode a data channel according to a channel estimation result of each terminal in the second terminal set within each repetition period and an uplink data signal on the time-frequency resource of the NOMA transmission unit block.

Optionally, the detection end condition includes at least one of: that a number of repetition times of the pilot activation detection reaches a threshold number of repetition times; that the second terminal sets determined through the pilot activation detection within at least two repetition periods are the same; and that a relative difference ratio of pilot prior existence probabilities determined by detecting and decoding the data channel within at least two repetition periods is not greater than a predetermined relative difference ratio threshold.

Based on any of the above-mentioned devices, the pilot activation detection module is further configured to perform, based on pilot signal received power, the pilot activation detection on each terminal in the first terminal set corresponding to the NOMA transmission unit block.

Optionally, the pilot activation detection module is further configured to perform LS channel estimation on a pilot signal on the NOMA transmission unit block in a frequency domain, to obtain a frequency domain LS channel estimation value, convert the frequency domain LS channel estimation value to a time domain channel estimation value, determine a detection statistic value and a judgment threshold of interference noise power according to the time domain channel estimation value, and determine the second terminal set according to the detection statistic value and the judgment threshold of the interference noise power.

Optionally, the pilot activation detection module is further configured to perform, based on a pilot-signal correlation, the pilot activation detection on each terminal in the first terminal set corresponding to the NOMA transmission unit block.

Optionally, the pilot activation detection module is further configured to determine an autocorrelation matrix of a pilot signal on each uplink subcarrier of the time-frequency resource of the NOMA transmission unit block, determine an average value of autocorrelation matrices of pilot signals on all uplink subcarriers of the time-frequency resource of the NOMA transmission unit block, determine a maximum eigenvalue and a minimum eigenvalue of the average value, and determine the second terminal set according to the maximum eigenvalue and the minimum eigenvalue.

Based on any of the above-mentioned devices, optionally, the terminals in the first terminal set include a terminal of an own cell and a terminal of an adjacent cell.

In another aspect, the present disclosure further provides a base station, including: a processor, a transceiver and a memory, wherein the processor is configured to read programs in the memory so as to: perform pilot activation detection on each terminal in a first terminal set corresponding to an non-orthogonal multiple access (NOMA) transmission unit block repeatedly until a detection end condition is met, wherein the first terminal set comprises terminals that may transmit uplink data on the NOMA transmission unit block, perform, on the time-frequency resource of the NOMA transmission unit block, channel estimation on each terminal in a second terminal set determined through the pilot activation detection within each repetition period, wherein the second terminal set comprises terminals that have actually transmitted the uplink data on the NOMA transmission unit block, and detect and decode a data channel according to a channel estimation result of each terminal in the second terminal set within each repetition period and an uplink data signal on the time-frequency resource of the NOMA transmission unit block; the transceiver is configured to receive and transmit data under the control of the processor; and the memory is configured to store therein data for the operation of the processor.

Optionally, the detection end condition includes at least one of: that a number of repetition times of the pilot activation detection reaches a threshold number of repetition times; that the second terminal sets determined through the pilot activation detection within at least two repetition periods are the same; and that a relative difference ratio of pilot prior existence probabilities determined by detecting and decoding the data channel within at least two repetition periods is not greater than a predetermined relative difference ratio threshold.

Based on any of the above-mentioned base stations, in the case that the pilot activation detection is performed on each terminal in the first terminal set corresponding to the NOMA transmission unit block, the processor is further configured to read the programs in the memory, so as to: perform, based on pilot signal received power, the pilot activation detection on each terminal in the first terminal set corresponding to the NOMA transmission unit block.

Optionally, in the case that the pilot activation detection is performed on each terminal in the first terminal set corresponding to the NOMA transmission unit block, the processor is further configured to read the programs in the memory, so as to: perform LS channel estimation on a pilot signal on the NOMA transmission unit block in a frequency domain, to obtain a frequency domain LS channel estimation value; convert the frequency domain LS channel estimation value to a time domain channel estimation value; determine a detection statistic value and a judgment threshold of interference noise power according to the time domain channel estimation value; and determine the second terminal set according to the detection statistic value and the judgment threshold of the interference noise power.

In the case that the pilot activation detection is performed on each terminal in the first terminal set corresponding to the NOMA transmission unit block, the processor is further configured to read the programs in the memory, so as to: perform, based on a pilot-signal correlation, the pilot activation detection on each terminal in the first terminal set corresponding to the NOMA transmission unit block.

Optionally, in the case that the pilot activation detection is performed on each terminal in the first terminal set corresponding to the NOMA transmission unit block, the processor is further configured to read the programs in the memory, so as to: determine an autocorrelation matrix of a pilot signal on each uplink subcarrier of the time-frequency resource of the NOMA transmission unit block; determine an average value of autocorrelation matrices of pilot signals on all uplink subcarriers of the time-frequency resource of the NOMA transmission unit block; determine a maximum eigenvalue and a minimum eigenvalue of the average value; and determine the second terminal set according to the maximum eigenvalue and the minimum eigenvalue.

Based on any of the above-mentioned base stations, optionally, the terminals in the first terminal set include a terminal of an own cell and a terminal of an adjacent cell.

In the technical solution provided by the embodiment of the present disclosure, the uplink detection at the base station side is implemented in the NOMA system in the case that the terminal does not perform the scheduling. By the pilot activation detection, the number of actual access terminals may be determined, and by repeatedly performing the pilot activation detection and data detection, a probability of error of the pilot activation detection and data detection at the base station side is reduced effectively, the accuracy of the pilot activation detection and the data detection is improved, and the requirement for mass connections of the 5G mobile communication system is met.

DETAILED DESCRIPTION

Before a technical solution according to an embodiment of the present disclosure is described in detail, a non-orthogonal multiple access (NOMA) transmission unit block is explained firstly.

In the embodiment of the present disclosure, the NOMA transmission unit block includes all NOMA basic transmission units occupying a same time-frequency resource in a same NOMA pattern matrix, and a size of time-frequency resources occupied by the transmission unit block is N times that of a physical resource block (PRB) in the LTE system defined by a standard version of LTE release 8, N being the number of rows in the above-mentioned pattern matrix.

Mappings of the NOMA basic transmission unit on time-frequency resources may be arranged in a centralized or decentralized manner. The centralized arrangement includes a centralized arrangement of data symbols associated with a NOMA basic transmission unit, the decentralized arrangement includes a decentralized arrangement of the data symbols associated with a NOMA basic transmission unit. In case of decentralized arrangement, the data symbols associated with each row of a pattern vector corresponding to the basic transmission unit are arranged decentrally and are mapped into different PRBs. The two above-mentioned arrangements are applicable to the present disclosure.

In each of the following embodiments of the present disclosure, a pattern division multiple access (PDMA) technology is described as an example. It should be noted that other NOMA technologies may also be applied to the embodiments of the present disclosure, and their implementations may refer to those of each of the following embodiments.

A PDMA basic transmission unit includes a quad group that consists of a time domain resource, a frequency domain resource, a pattern vector resource and a pilot resource.

The time domain resource corresponding to the PDMA basic transmission unit takes one or more OFDM symbols as a basic unit.

The frequency domain resource corresponding to the PDMA basic transmission unit takes a frequency domain subcarrier group as a basic unit, and the number of subcarriers included in the frequency domain subcarrier group is an integral multiple of the number of rows of the NOMA pattern matrix.

The pattern vector resource corresponding to the PDMA basic transmission unit takes one column of the NOMA pattern matrix as a basic unit.

The pilot resource corresponding to the PDMA basic transmission unit takes one orthogonal pilot in a group of orthogonal pilot sets as a basic unit.

In some embodiment of the present disclosure, it is assumed that the pilots allocated to different terminals are completely orthogonal. The orthogonal manner may include, but not limited to, one or any combination of code division multiplexing (CDM), frequency division multiplexing (FDM) and time division multiplexing (TDM).

The embodiment of the present disclosure will be described below in detail with reference to the accompanying drawings.

Figure 1:
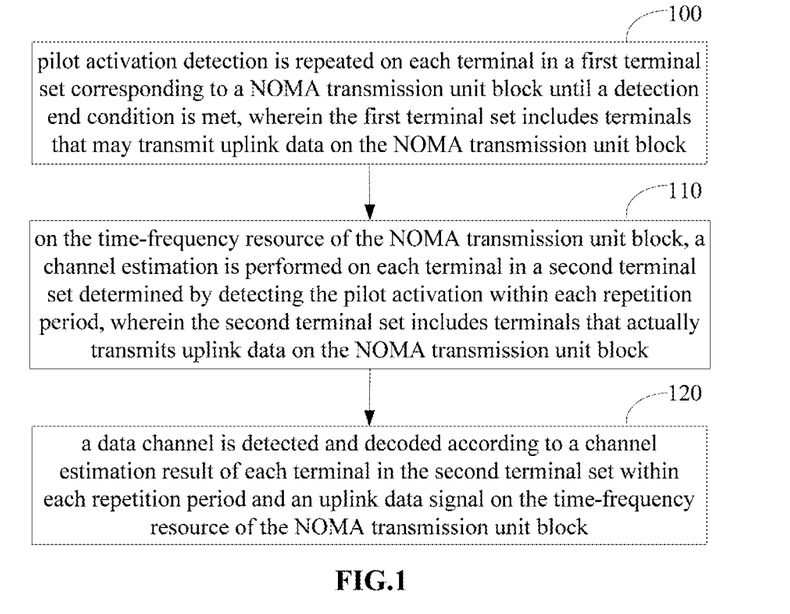
FIG. 1 is a flow chart of a method according to some embodiments of the present disclosure.

As shown in FIG. 1, the uplink detection method in a NOMA system according to some embodiments of the present disclosure includes the following steps.

In step 100, pilot activation detection is repeated on each terminal in a first terminal set corresponding to a NOMA transmission unit block until a detection end condition is met, wherein the first terminal set includes terminals that may transmit uplink data on the NOMA transmission unit block.

In the embodiment of the present disclosure, the specific implementation way of how to determine the first terminal set is not limited. For example, all terminals located in an own cell belong to the first terminal set. Optionally, terminals located in an adjacent cell may also belong to the first terminal set. The number of terminals included in the first terminal set is dependent on actual processing ability of the base station.

In step 110, on the time-frequency resource of the NOMA transmission unit block, channel estimation is performed on each terminal in a second terminal set determined through the pilot activation within each repetition period, wherein the second terminal set includes terminals that have actually transmitted uplink data on the NOMA transmission unit block.

In step 120, a data channel is detected and decoded according to a channel estimation result of each terminal in the second terminal set within each repetition period as well as an uplink data signal on the time-frequency resource of the NOMA transmission unit block.

In the method according to the embodiment of the present disclosure, the uplink detection at the base station side is implemented in the NOMA system in the case that the terminal does not perform the scheduling. By the pilot activation detection, the number of actual access terminals may be determined, and by repeatedly performing the pilot activation detection and data detection, a probability of error of the pilot activation detection and data detection at the base station side is reduced effectively, the accuracy of the pilot activation detection is improved, and the requirement of the 5G system for mass connections is met.

In the embodiment of the present disclosure, the implementation principle of the pilot activation detection is as below.

It is assumed that a single transmitting antenna is used at the terminal, the total number of on-line terminals supported in the NOMA transmission unit block is M (that is, the number of terminals in the first terminal set), the number of terminals in the terminal set (the second terminal set) actually transmitting services is K, a length of a pilot sequence is $L_{pilot}$, the pilot signal at the base station side may be denoted as:

$$p = \sum_{k \in M} I_k h_k b_k + n = H_s B + n$$

wherein P with dimensions $ML_{pilot} \times 1$ is a vector of a received pilot signal; and $H_s$ with dimensions $ML_{pilot} \times ML_{pilot}$ is an equivalent channel matrix estimation matrix and defined as follows:

$$H_s = IH = \begin{bmatrix} \vec{i_1} * \vec{h_1} & 0 & \ldots & 0 \\ 0 & \vec{i_2} * \vec{h_2} & \ldots & 0 \\ \ldots & \ldots & \ldots & \ldots \\ 0 & 0 & \ldots & \vec{i_M} * \vec{h_M} \end{bmatrix},$$

wherein $\vec{h}_k$ and $\vec{i}_k$ are diagonal matrixes of $L_{pilot} \times L_{pilot}$ (k=1, 2, . . . . M), elements on a diagonal line of $\vec{h}_k$ represent channel coefficients of the pilot subcarrier, and $\vec{i}_k$ is a diagonal matrix where all the diagonal elements are 1 or 0. In the case that the terminal k has data to send, all the diagonal elements of $\vec{i}_k$ are 1, otherwise, 0. I and H respectively represent a channel coefficient matrix of all terminals and a diagonal matrix of an indicative function and defined as follows.

$$I = \begin{bmatrix} \vec{i_1} & 0 & \ldots & 0 \\ 0 & \vec{i_2} & \ldots & 0 \\ \ldots & \ldots & \ldots & \ldots \\ 0 & 0 & \ldots & \vec{i_M} \end{bmatrix}, H = \begin{bmatrix} \vec{h_1} & 0 & \ldots & 0 \\ 0 & \vec{h_2} & \ldots & 0 \\ \ldots & \ldots & \ldots & \ldots \\ 0 & 0 & \ldots & \vec{h_M} \end{bmatrix}$$

B with dimensions $ML_{pilot} \times 1$ is a column vector consisting of all the M terminal pilot sequences, and $$B = \begin{bmatrix} \vec{b_1} \\ \vec{b_2} \\ \ldots \\ \vec{b_M} \end{bmatrix},$$

wherein $\vec{b}_k$ is a column vector of $L_{pilot} \times 1$ (k=1, 2, . . . . M); and n with dimensions $ML_{pilot} \times 1$ is an interference noise vector including an adjacent cell interference and a thermal noise inside the cell.

According to the above formula, it is known that an object of the pilot activation detection is to judge which matrix (matrices) where all diagonal elements are 0 and which matrix (matrices) where all diagonal elements are 1 in the matrices $\vec{i}_k$ (k=1, 2, . . . . M) of the detection matrix I. The value 0 means the terminal that does not transmit data, while the value 1 means the terminal that transmits data.

In the embodiment of the present disclosure, optionally, the detection end condition includes at least one of: that a number of repetition times of the pilot activation detection reaches a threshold number of repetition times; that the second terminal sets determined through the pilot activation detection within at least two repetition periods are the same; and that a relative difference ratio of pilot prior existence probabilities determined by detecting and decoding the data channel within at least two repetition periods is not greater than a predetermined relative difference ratio threshold. The number of repetition times of the pilot activation detection refers to the number of times of the pilot activation detection repeated on the first terminal set.

Figure 2:
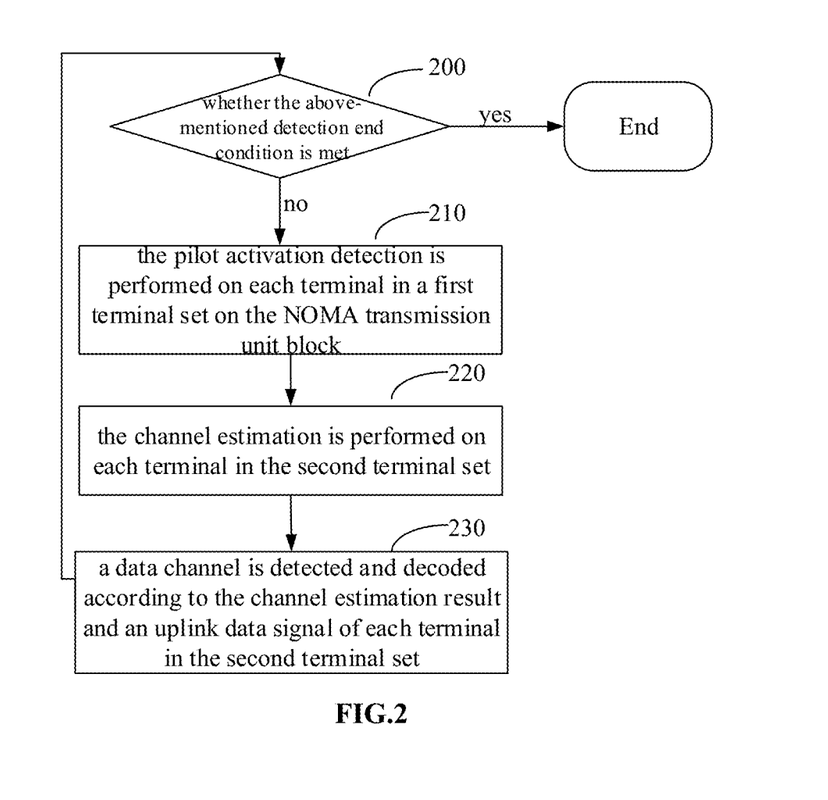
FIG. 2 is a flow chart of a method according to some embodiments of the present disclosure.

The above embodiment may be represented by, but not limited to, the flow chart shown in FIG. 2.

In step 200, it is judged whether the above-mentioned detection end condition is met. If yes, the flow ends; otherwise, the step 210 is executed.

In step 210, the pilot activation is detected on each terminal in a first terminal set on the NOMA transmission unit block, and step 220 is executed.

The execution result of step 210 is to determine a second terminal set.

In step 220, the channel estimation is performed on each terminal in the second terminal set, and the step 230 is executed.

In step 230, a data channel is detected and decoded according to the channel estimation result and an uplink data signal of each terminal in the second terminal set, and the process returns to the step 200.

The execution result of step 230 at least includes the determined pilot prior existing probability.

Based on any of the above-mentioned method embodiments, optionally, one implementation of detecting pilot activation on each terminal in a first terminal set corresponding to the NOMA transmission unit block may be as below.

Based on pilot signal received power, pilot activation is detected on each terminal in a first terminal set corresponding to the NOMA transmission unit block.

There is a plurality of implementations to detect pilot activation on each terminal in a first terminal set corresponding to the NOMA transmission unit block based on the pilot signal received power. The embodiment of the present disclosure provides an optional implementation as follows.

An average power of a pilot signal on each uplink subcarrier of the time-frequency resource of the NOMA transmission unit block is determined; based on the average power, an average value of covariance matrices of pilot signals on all the uplink subcarriers of the time-frequency resource in the NOMA transmission unit block is determined; and the second terminal set is determined according to the average value of the covariance matrices.

It is assumed that the channel estimation value of the terminal k on the $n_{sub}$th subcarrier and on the $n_r$th receiving antenna is $H_{k,nr}(n_{sub})$, for the terminal without data transmission, the average power on all the antennas is $$\frac{1}{N_R} \sum_{n_r=1}^{N_R} |H_{k,n_r}(n_{sub})|^2 \to \sigma^2;$$

and for the terminal with data transmission, $$\frac{1}{N_R} \sum_{n_r=1}^{N_R} |H_{k,n_r}(n_{sub})|^2 \to P1;$$

wherein $\sigma^2$ represents the interference thermal noise power, and P1 represents an average power of received signals of a unit resource unit (RE) under an uplink power control condition. Therefore, the channel estimation of the pilot resources corresponding to the PDMA basic transmission units occupied by all the on-line terminals may be performed by using a traditional channel estimation algorithm, and the above-mentioned expression of the pilot signal is used to judge the terminals transmit data on which PDMA basic transmission units.

In step 1, least squares (LS) channel estimation is performed on a pilot of the NOMA transmission unit block in a frequency domain, to obtain a frequency domain LS channel estimation value.

In step 2, the frequency domain LS channel estimation value is converted to a time domain channel estimation value.

The conversion may include, but not limited to, inverse discrete Fourier transform (IDFT).

In step 3, a detection statistic $\Lambda$ and a judgment threshold of the interference noise power are calculated according to the time domain channel estimation value.

Specifically, a time domain signal window of a target terminal is selected, and pilot signal received power within the time domain signal window is calculated, and the detection statistic $\Lambda$ is shown as expression:

$$\Lambda = \frac{1}{N_{sub}} \sum_{n_{sub}=1}^{N_{sub}} P_H(n_{sub}) = \frac{1}{N_{sub}} \frac{1}{N_R} \sum_{n_{sub}=1}^{N_{sub}} \sum_{n_r=1}^{N_R} |h_{k,n_r}(n_{sub})|^2$$

wherein k represents a terminal number, $N_R$ is the number of antennas of the received signal, $n_{sub}$ represents an index of subcarriers, and $N_{sub}$ represents a total number of subcarriers.

The judgment threshold is defined as Th=β□$\sigma^2$, wherein $\sigma^2$ is the interference noise power, and β may be selected according to a current false alarm rate, for example: β=3.

The calculation of the interference noise power includes, but not limited to, the two following methods.

In method 1: when at least one idle window is reserved in case of pilot allocation, the average power of all time domain paths within the idle window is calculated as the interference noise power $\sigma^2$.

In method 2: all the time domain paths other than the time domain signal window of a terminal located in a target cell are taken as candidate interference noise windows. All the time domain paths within the candidate interference noise window are ordered in an ascending sequence according to power values, and the average of selected first N values is calculated as the interference noise power $\sigma^2$, wherein N is an integral greater than or equal to 2.

In step 4, the judgment is made according to the following expression.

$$\begin{cases} \Lambda \geq Th, \text{ the terminal } k \text{ that transmits data} \\ \Lambda < Th, \text{ the terminal } k \text{ that does not transmit data} \end{cases}$$

Optionally, another implementation of detecting pilot activation on each terminal in a first terminal set corresponding to the NOMA transmission unit block may be as below.

Based on a pilot-signal correlation, pilot activation is detected on each terminal in a first terminal set corresponding to the NOMA transmission unit block.

Its basic concept is to make elements in $(H_k(n_{sub}))$ (the column vector of dimensions $N_R \times 1$) formed by a signal received by multiple antennas have correlation that comes from a multi-antenna signal. Therefore, off-diagonal elements of an autocorrelation matrix of $H_k(n_{sub})$ have nonzero values, such that a difference between a decomposed maximum value and a minimum eigenvalue is relatively large, while for a white noise, the autocorrelation matrix may be actually considered as a diagonal matrix approximately, and all the eigenvalues are almost equal to each other. Such a difference between an eigenvalue of the received signal and a noise eigenvalue may be used for detecting a signal.

There is a plurality of implementations to detect pilot activation on each terminal in a first terminal set corresponding to the NOMA transmission unit block based on a pilot-signal correlation. An optional implementation is exemplified in the present disclosure as below.

An autocorrelation matrix of a pilot signal on each uplink subcarrier of the time-frequency resource of the NOMA transmission unit block is determined; an average value of autocorrelation matrices of pilot signals on all uplink subcarriers of the time-frequency resource of the NOMA transmission unit block is determined; a maximum eigenvalue and a minimum eigenvalue of the average value are determined; and the second terminal set is determined according to the maximum eigenvalue and the minimum eigenvalue.

For example, in step 1, the autocorrelation matrix $R_H(n_{sub})$ of the pilot received signal on each subcarrier is calculated:

$$R_H(n_{sub}) = H_{n_r}(k) H_{n_r}^H(k)$$

wherein $N_R$ is the number of antennas of the received signal, and k represents a user index.

In step 2, the average $\overline{R}_H$ of the autocorrelation matrix of the pilot signals on all the uplink subcarriers is calculated:

$$\overline{R}_H = \frac{1}{N_{sub}} \sum_{n_{sub}=1}^{N_{sub}} R_H(n_{sub})$$

In step 3, the maximum and minimum eigenvalues of $\overline{R}_H$ are obtained, respectively being $\lambda_{max}$ and $\lambda_{min}$.

In step 4, the detection statistic is obtained and judged, and is:

$$\Lambda = \lambda_{max} / \lambda_{min}$$

In step 5, the judgment threshold is defined as $\gamma_1$, and is judged according to the following expression.

$$\begin{cases} \Lambda \geq \gamma_1, \text{ the terminal } k \text{ that transmits data} \\ \Lambda < \gamma_1, \text{ the terminal } k \text{ that does not transmit data} \end{cases}$$

The technical solution according to the embodiment of the present disclosure will be explained in detail in combination with specific application scenarios.

In scenario 1, A PDMA [3, 7] pattern matrix with an overload rate of 233% is adopted, based on the pilot signal received power, the pilot activation is detected, the base station has two receiving antennas, and the detection end condition is that the number of repetition times of the pilot activation detection reaches the threshold number of repetition times (the value is 2), and $\beta=3$.

Figure 5:
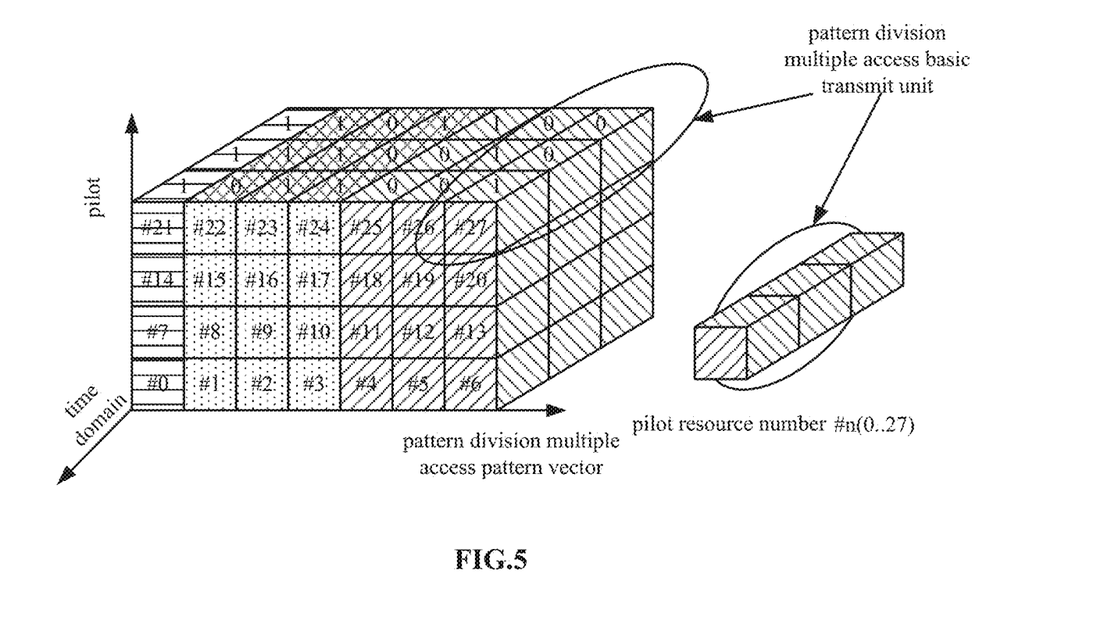
FIG. 5 is a schematic diagram of a NOMA transmission unit block according to some embodiment corresponding to a first scenario of the present disclosure.

The PDMA transmission unit block with uplink free schedule in the first scenario is as shown in FIG. 5.

The PDMA transmission unit block in FIG. 5 includes 28 candidate PDMA basic transmission units within a same time-frequency resource group. The allocation of the pilot resources and PDMA pattern vector resources will be introduced below respectively. 0 to 6 correspond to a same pilot resource and different PDMA pattern vectors. Similarly, 7 to 13 correspond to a same pilot resource and different pattern vectors; 0, 7, 14, 21 correspond to a same PDMA pattern vector and different pilot resources, and 1, 8, 15, 22 also correspond to a same PDMA pattern vector and different pilot resources, and so on.

Without loss of generality, it is assumed that the PDMA [3, 7] pattern matrix $B_{PDMA, 3\times 7}$ is adopted, each column of which corresponds to two pilots, and the pilots are transmitted on three RE resources corresponding to three rows of the matrix $B_{PDMA, 3\times 7}$. The terminals 1 to 7 are mapped to the first to seventh columns of the matrix $B_{PDMA, 3\times 7}$, corresponding to the pilots 1 to 7; and similarly, the terminals 8 to 14 are mapped to the first to seventh columns of the matrix $B_{PDMA, 3\times 7}$, corresponding to the pilots 8 to 14. $B_{PDMA, 3\times 7}$ is defined as follows.

$$B_{PDMA,3\times 7} = \begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1_{Pilot_{User\_7}, Pilot_{User\_14}} \end{bmatrix}$$

Wherein $Pilot_{User\_7}$ and $Pilot_{User\_14}$ are PDMA pilots corresponding to the terminal 7 and the terminal 14 respectively.

In the present embodiment, the "NOMA transmission unit block" is defined as all the PDMA basic transmission units which occupy the same three PRB block groups in the PDMA pattern matrix $B_{PDMA, 3\times 7}$.

It is assumed that at some point, data is transmitted by the terminals 1 to 6 and 14, no data is transmitted by the terminals 7 to 14, and the channel estimation vector obtained through the channel estimation on the $n_r$th receiving antenna by the terminal User_n is:

$$H^{(n_r)}_{PDMA,User\_n} = \begin{bmatrix} H^{(n_r)}_{1,User\_n} \\ H^{(n_r)}_{2,User\_n} \\ H^{(n_r)}_{3,User\_n} \end{bmatrix}.$$

A First Cycle

In step 1, it is judged whether the detection end condition is met, and if not, then the process goes into step 2.

In step 2, the base station detects the pilot activation on all possible on-line terminal sets (the first terminal set) M on the scheduling-free basic unit, to obtain an effective terminal set (that is, the second terminal set) K, and the process goes into step 3.

Specifically, the pilot activation is detected according to the following formula.

$$\begin{cases} \Lambda \geq Th, \text{ the terminal } k \text{ that has transmitted data} \\ \Lambda < Th, \text{ the terminal } k \text{ that does not transmit data} \end{cases}$$

wherein M=14, and Th=$3\sigma^2$.

It is judged that the obtained effective terminal set includes terminals 1 to 6.

In step 3, the base station performs the channel estimation on each terminal in the effective terminal set K obtained by step 2, and the process goes into step 4.

In step 4, the base station detects and decodes the data channel according to the channel estimation value in step 3 and the received signal, to output the pilot prior existence probability updated by a data detection decoder, and the process returns to step 1.

The PDMA equivalent channel estimation matrix is:

$$H^{eff}_{PDMA} = \begin{bmatrix} H^{(1)}_{PDMA} \square B_{PDMA,3\times 6} \\ H^{(2)}_{PDMA} \square B_{PDMA,3\times 6} \end{bmatrix}$$

$$= \begin{bmatrix} H^{(1)}_{1,User\_1} & H^{(1)}_{1,User\_2} & 0 & H^{(1)}_{1,User\_4} & H^{(1)}_{1,User\_5} & 0 \\ H^{(1)}_{2,User\_1} & H^{(1)}_{2,User\_2} & H^{(1)}_{2,User\_3} & 0 & 0 & H^{(1)}_{2,User\_6} \\ H^{(1)}_{3,User\_1} & 0 & H^{(1)}_{3,User\_3} & H^{(1)}_{3,User\_4} & 0 & 0 \\ H^{(2)}_{1,User\_1} & H^{(2)}_{1,User\_2} & 0 & H^{(2)}_{1,User\_4} & H^{(2)}_{1,User\_5} & 0 \\ H^{(2)}_{2,User\_1} & H^{(2)}_{2,User\_2} & H^{(2)}_{2,User\_3} & 0 & 0 & H^{(2)}_{2,User\_6} \\ H^{(2)}_{3,User\_1} & 0 & H^{(2)}_{3,User\_3} & H^{(2)}_{3,User\_4} & 0 & 0 \end{bmatrix}$$

wherein $\square$ represents a dot product of elements at corresponding positions of the matrix; and $$B_{PDMA,3\times 6} = \begin{bmatrix} 1 & 1 & 0 & 1 & 1 & 0 \\ 1 & 1 & 1 & 0 & 0 & 1 \\ 1 & 0 & 1 & 1 & 0 & 0 \end{bmatrix}$$

$$H^{(n_r)}_{PDMA} =$$

$$\begin{bmatrix} H^{(n_r)}_{1,User\_1} & H^{(n_r)}_{1,User\_2} & H^{(n_r)}_{1,User\_3} & H^{(n_r)}_{1,User\_4} & H^{(n_r)}_{1,User\_5} & H^{(n_r)}_{1,User\_6} \\ H^{(n_r)}_{2,User\_1} & H^{(n_r)}_{2,User\_2} & H^{(n_r)}_{2,User\_3} & H^{(n_r)}_{2,User\_4} & H^{(n_r)}_{2,User\_5} & H^{(n_r)}_{2,User\_6} \\ H^{(n_r)}_{3,User\_1} & H^{(n_r)}_{3,User\_2} & H^{(n_r)}_{3,User\_3} & H^{(n_r)}_{3,User\_4} & H^{(n_r)}_{3,User\_5} & H^{(n_r)}_{3,User\_6} \end{bmatrix}$$

A Second Cycle

In step 1, it is judged whether the detection end condition is met, and if not, then the process goes into step 2.

In step 2, the base station detects the pilot activation on all possible on-line terminal sets M on the scheduling-free basic unit, to obtain the effective terminal set K, and the process goes into step 3.

The pilot activation is detected according to the following formula.

$$\begin{cases} \Lambda \geq Th, \text{the terminal } k \text{ that has transmitted data} \\ \Lambda < Th, \text{the terminal } k \text{ that does not transmit data} \end{cases}$$

wherein M=14, and h=3σ².

It is judged that the obtained second terminal set includes terminals 1 to 6 and 14.

In step 3, the base station performs the channel estimation on each terminal in the effective terminal set K obtained in step 2, and the process goes into step 4.

In step 4, the base station detects and decodes the data channel according to the channel estimation value in step 3 and the received signal, to output the pilot prior existence probability updated by the data detection decoder, and the process returns to step 1.

The PDMA equivalent channel estimation matrix is:

$$H_{PDMA}^{eff} = \begin{bmatrix} H_{PDMA}^{(1)} \square B_{PDMA,3\times7} \\ H_{PDMA}^{(2)} \square B_{PDMA,3\times7} \end{bmatrix}$$

$$= \begin{bmatrix} H_{1,User\_1}^{(1)} & H_{1,User\_2}^{(1)} & 0 & H_{1,User\_4}^{(1)} & H_{1,User\_5}^{(1)} & 0 & 0 \\ H_{2,User\_1}^{(1)} & H_{2,User\_2}^{(1)} & H_{2,User\_3}^{(1)} & 0 & 0 & H_{2,User\_6}^{(1)} & 0 \\ H_{3,User\_1}^{(1)} & 0 & H_{3,User\_3}^{(1)} & H_{3,User\_4}^{(1)} & 0 & 0 & H_{3,User\_14}^{(1)} \\ H_{1,User\_1}^{(2)} & H_{1,User\_2}^{(2)} & 0 & H_{1,User\_4}^{(2)} & H_{1,User\_5}^{(2)} & 0 & 0 \\ H_{2,User\_1}^{(2)} & H_{2,User\_2}^{(2)} & H_{2,User\_3}^{(2)} & 0 & 0 & H_{2,User\_6}^{(2)} & 0 \\ H_{3,User\_1}^{(2)} & 0 & H_{3,User\_3}^{(2)} & H_{3,User\_4}^{(2)} & 0 & 0 & H_{3,User\_14}^{(2)} \end{bmatrix}$$

wherein $\square$ represents a dot product of elements at corresponding positions of the matrix; and $$B_{PDMA,3\times7} = \begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1 \end{bmatrix}$$

$$H_{PDMA}^{(n_r)} = \begin{bmatrix} H_{1,User\_1}^{(n_r)} & H_{1,User\_2}^{(n_r)} & H_{1,User\_3}^{(n_r)} & H_{1,User\_4}^{(n_r)} & H_{1,User\_5}^{(n_r)} & H_{1,User\_6}^{(n_r)} & H_{1,User\_14}^{(n_r)} \\ H_{2,User\_1}^{(n_r)} & H_{2,User\_2}^{(n_r)} & H_{2,User\_3}^{(n_r)} & H_{2,User\_4}^{(n_r)} & H_{2,User\_5}^{(n_r)} & H_{2,User\_6}^{(n_r)} & H_{2,User\_14}^{(n_r)} \\ H_{3,User\_1}^{(n_r)} & H_{3,User\_2}^{(n_r)} & H_{3,User\_3}^{(n_r)} & H_{3,User\_4}^{(n_r)} & H_{3,User\_5}^{(n_r)} & H_{3,User\_6}^{(n_r)} & H_{3,User\_14}^{(n_r)} \end{bmatrix}$$

A Third Cycle

In step 1, it is judged whether the detection end condition is met. Since the number of detection repeated by the receiver is 3, larger than the maximum number threshold of 2, the end condition is met, and the process ends.

In scenario 2, A PDMA [4, 6] pattern matrix with an overload rate of 150 is adopted, based on the pilot-signal correlation, the pilot activation is detected, the base station has four receiving antennas, and the detection end condition is that the effective terminal sets (the second terminal sets) obtained by the former and later pilot activation detections are identical.

Without loss of generality, it is assumed that the PDMA [4, 6] pattern matrix $B_{PDMA, 4\times6}$ is adopted, each column of which corresponds to two pilots, and the pilots are transmitted on four RE resources corresponding to four rows of the matrix $B_{PDMA, 4\times6}$. The terminals 1 to 6 are mapped to the first to sixth columns of the matrix $B_{PDMA, 4\times6}$, corresponding to the pilots 1 to 6; similarly, the terminals 7 to 12 are mapped to the first to sixth columns of the matrix $B_{PDMA, 4\times6}$, corresponding to the pilots 7 to 12; and the terminals 13 to 18 in the adjacent cell are also mapped to the first to sixth columns of the matrix $B_{PDMA, 4\times6}$, corresponding to the pilots 1 to 6. $B_{PDMA, 4\times6}$ is defined as follows:

$$B_{PDMA,4\times6} = \begin{bmatrix} 1 & 1 & 0 & 1 & 0 & 0 \\ 1 & 1 & 1 & 1 & 0 & 0 \\ 1 & 1 & 1 & 0 & 1 & 0 \\ \underline{1} & 0 & 1 & 0 & 1 & 1 \\ Pilot_{User\_1} & & & & & \\ Pilot_{User\_7} & & & & & \\ Pilot_{User\_13}(adjacent\ cell) & & & & & \end{bmatrix}$$

wherein $Pilot_{User\_1}$, $Pilot_{User\_7}$ and $Pilot_{User\_13}$ are PDMA pilots corresponding to the terminals 1, 7 and 13 respectively.

In the present embodiment, the "NOMA transmission unit block" is defined as all the PDMA basic transmission units which occupy the same four PRB block groups in the PDMA pattern matrix $B_{PDMA, 4\times6}$.

It is assumed that at some point, data is transmitted at the terminals 1 to 5, 10 to 11 and 18, no data is transmitted at other terminals, and the channel estimation vector obtained though the channel estimation on the $n_r$th receiving antenna by the terminal User_n is $$H_{PDMA,User\_n}^{(n_r)} = \begin{bmatrix} H_{1,User\_n}^{(n_r)} \\ H_{2,User\_n}^{(n_r)} \\ H_{3,User\_n}^{(n_r)} \end{bmatrix}.$$

A First Cycle

In step 1, it is judged whether the detection end condition is met, and if not, then the process goes into step 2.

In step 2, the base station detects the pilot activation on all possible on-line terminal sets M on the scheduling-free basic unit, to obtain the effective terminal set K, and the process goes into step 3.

The pilot activation is detected according to the following formula.

$$\begin{cases} \Lambda \geq \gamma_1, \text{ the terminal } k \text{ that has transmitted data} \\ \Lambda < \gamma_1, \text{ the terminal } k \text{ that does not transmit data} \end{cases}$$

wherein $M=18$, and $\gamma_1=2$.

It is judged that the obtained set K includes 7 terminals, terminals 1 to 5 and 10 to 11.

In step 3, the base station performs the channel estimation on each terminal in the effective terminal set K obtained by step 2, and the process goes into step 4.

In step 4, the base station detects and decodes the data channel according to the channel estimation value in step 3 and the received signal, to output the pilot prior existence probability updated by the data detection decoder, and the process returns to step 1.

The PDMA equivalent channel estimation matrix is:

$$H_{PDMA}^{eff} = \begin{bmatrix} H_{PDMA}^{(1)} \square B_{PDMA,4\times 8} \\ H_{PDMA}^{(2)} \square B_{PDMA,4\times 8} \\ H_{PDMA}^{(3)} \square B_{PDMA,4\times 8} \\ H_{PDMA}^{(4)} \square B_{PDMA,4\times 8} \end{bmatrix}$$

wherein $\square$ represents a dot product of elements at corresponding positions of the matrix; and $$B_{PDMA,4\times 8} = \begin{bmatrix} 1 & 1 & 0 & 1 & 0 & 1 & 0 & 0 \\ 1 & 1 & 1 & 1 & 0 & 1 & 0 & 0 \\ 1 & 1 & 1 & 0 & 1 & 0 & 1 & 0 \\ 1 & 0 & 1 & 0 & 1 & 0 & 1 & 1 \end{bmatrix}$$

$$H_{PDMA}^{(n_r)} = \begin{bmatrix} H_{1,User\_1}^{(n_r)} & H_{1,User\_2}^{(n_r)} & H_{1,User\_3}^{(n_r)} & H_{1,User\_4}^{(n_r)} & H_{1,User\_5}^{(n_r)} & H_{1,User\_10}^{(n_r)} & H_{1,User\_11}^{(n_r)} & H_{1,User\_18}^{(n_r)} \\ H_{2,User\_1}^{(n_r)} & H_{2,User\_2}^{(n_r)} & H_{2,User\_3}^{(n_r)} & H_{2,User\_4}^{(n_r)} & H_{2,User\_5}^{(n_r)} & H_{2,User\_10}^{(n_r)} & H_{2,User\_11}^{(n_r)} & H_{2,User\_18}^{(n_r)} \\ H_{3,User\_1}^{(n_r)} & H_{3,User\_2}^{(n_r)} & H_{3,User\_3}^{(n_r)} & H_{3,User\_4}^{(n_r)} & H_{3,User\_5}^{(n_r)} & H_{3,User\_10}^{(n_r)} & H_{3,User\_11}^{(n_r)} & H_{3,User\_18}^{(n_r)} \\ H_{4,User\_1}^{(n_r)} & H_{4,User\_2}^{(n_r)} & H_{4,User\_3}^{(n_r)} & H_{4,User\_4}^{(n_r)} & H_{4,User\_5}^{(n_r)} & H_{4,User\_10}^{(n_r)} & H_{4,User\_11}^{(n_r)} & H_{4,User\_18}^{(n_r)} \end{bmatrix}$$

A Second Cycle

In step 1, it is judged whether the detection end condition is met, and if not, then the process goes into step 2.

In step 2, the base station detects the pilot activation on all possible on-line terminal sets M on the scheduling-free basic unit, to obtain the effective terminal set K, and the process goes into step 3.

The pilot activation detection is detected according to the following formula.

$$\begin{cases} \Lambda \geq \gamma_1, \text{ the terminal } k \text{ that has transmitted data} \\ \Lambda < \gamma_1, \text{ the terminal } k \text{ that does not transmit data} \end{cases}$$

wherein $M=18$, and $\gamma_1=2$.

It is judged that the set K includes 7 terminals, terminals 1 to 5 and 10 to 11.

In step 3, the base station performs the channel estimation on each user in the effective terminal set K obtained in step 2, and the process goes into step 4.

In step 4, the base station detects and decodes the data channel according to the channel estimation value in step 2 and the received signal, to output the pilot prior existence probability updated by the data detection decoder, and the process returns to step 1.

The PDMA equivalent channel estimation matrix is:

$$H_{PDMA}^{eff} = \begin{bmatrix} H_{PDMA}^{(1)} \square B_{PDMA,4\times 8} \\ H_{PDMA}^{(2)} \square B_{PDMA,4\times 8} \\ H_{PDMA}^{(3)} \square B_{PDMA,4\times 8} \\ H_{PDMA}^{(4)} \square B_{PDMA,4\times 8} \end{bmatrix}$$

wherein $\square$ represents a dot product of elements at corresponding positions of the matrix; and $$B_{PDMA,4\times 8} = \begin{bmatrix} 1 & 1 & 0 & 1 & 0 & 1 & 0 & 0 \\ 1 & 1 & 1 & 1 & 0 & 1 & 0 & 0 \\ 1 & 1 & 1 & 0 & 1 & 0 & 1 & 0 \\ 1 & 0 & 1 & 0 & 1 & 0 & 1 & 1 \end{bmatrix}$$

-continued $$H_{PDMA}^{(\cdot)} = \begin{bmatrix} \cdots \end{bmatrix}$$

A Third Cycle

In step 1, it is judged whether the detection end condition is met. Since the effective terminal sets obtained by the former and later pilot activation detections are identical, the end condition is met, and the process ends.

Figure 3:
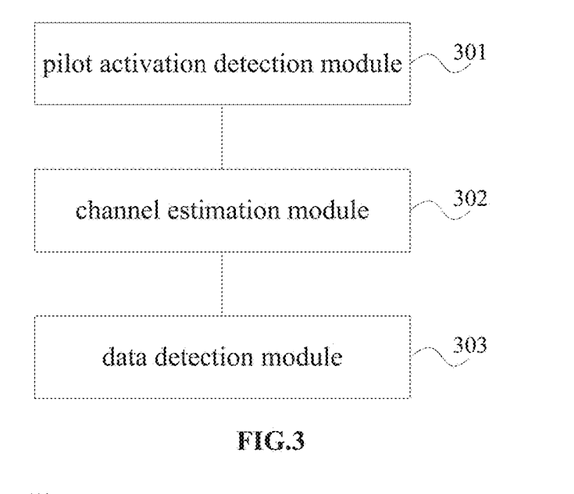
FIG. 3 is a schematic diagram of a device according to some embodiments of the present disclosure.

Based on the disclosed concept the same as the method, some embodiments of the present disclosure further provide an uplink detection device in a NOMA system, as shown in FIG. 3, including pilot activation detection module 301, a channel estimation module 302, and a data detection module 303.

The pilot activation detection module 301 is configured to repeatedly perform pilot activation detection on each terminal in a first terminal set corresponding to a NOMA transmission unit block until a detection end condition is met, wherein the first terminal set includes terminals that may transmit uplink data on the NOMA transmission unit block.

The channel estimation module 302 is configured to, on time-frequency resources of the NOMA transmission unit block, perform channel estimation on each terminal in a second terminal set determined through the pilot activation detection within each repetition period, wherein the second terminal set includes terminals that have actually transmitted uplink data on the NOMA transmission unit block.

The data detection module 303 is configured to detect and decode a data channel according to a channel estimation result of each terminal in the second terminal set within each repetition period and an uplink data signal on the time-frequency resources of the NOMA transmission unit block.

In the device according to the embodiment of the present disclosure, the uplink detection at the base station side is implemented in the NOMA system in the case that the terminal does not perform the scheduling. By the pilot activation detection, the number of actual access terminals may be determined, and by repeatedly performing the pilot activation detection and data detection, a probability of error of the pilot activation detection and data detection at the base station side is reduced effectively, the accuracy of the pilot activation detection is improved, and the requirement of mass connections for the 5G system for is met.

Optionally, the detection end condition includes at least one of the following: that a number of repetition times of the pilot activation detection reaches a threshold number of repetition times; that the second terminal sets determined through the pilot activation detection within at least two repetition periods are the same; and that a relative difference ratio of pilot prior existence probabilities determined by detecting and decoding the data channel within at least two repetition periods is not greater than a predetermined relative difference ratio threshold.

Based on any of the above-mentioned device embodiments, the pilot activation detection module may be configured to, based on a pilot signal received power, detect pilot activation on each terminal in a first terminal set corresponding to the NOMA transmission unit block.

Optionally, the pilot activation detection module is configured to perform LS channel estimation on a pilot signal on the NOMA transmission unit block in a frequency domain, to obtain a frequency domain LS channel estimation value, convert the frequency domain LS channel estimation value to a time domain channel estimation value, determine a detection statistic value and a judgment threshold of an interference noise power according to the time domain channel estimation value, and determine the second terminal set according to the detection statistic value and the judgment threshold of the interference noise power.

The pilot activation detection module may also be configured to, based on a pilot-signal correlation, detect pilot activation on each terminal in a first terminal set corresponding to the NOMA transmission unit block.

Optionally, the pilot activation detecting module is configured to determine an autocorrelation matrix of a pilot signal on each uplink subcarrier of the time-frequency resource of the NOMA transmission unit block, determine an average value of autocorrelation matrices of pilot signals on all uplink subcarriers of the time-frequency resources of the NOMA transmission unit block, determine a maximum eigenvalue and a minimum eigenvalue of the average value, and determine the second terminal set according to the maximum eigenvalue and the minimum eigenvalue.

Based on any of the above-mentioned device embodiments, optionally, the terminals in the first terminal set include a terminal of an own cell and a terminal of an adjacent cell.

Figure 4:
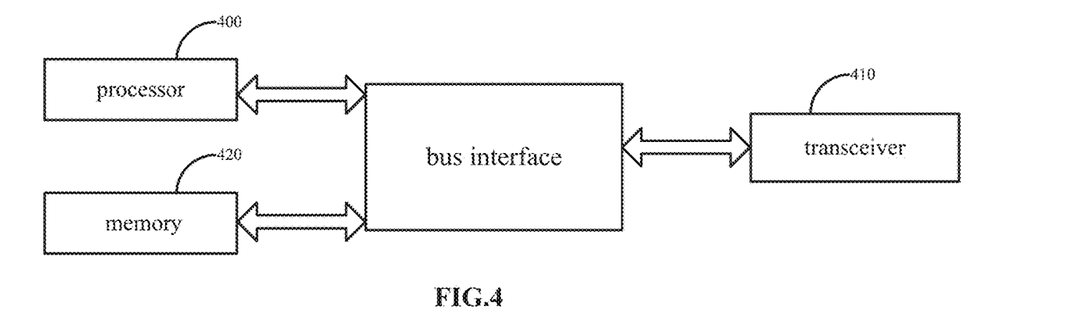
FIG. 4 is a structural schematic diagram of a base station according to some embodiments of the present disclosure.

Based on the disclosed concept the same as the method, some embodiments of the present disclosure further provide a base station, as shown in FIG. 4, including a processor 400, a transceiver 410 and a memory 420.

The processor 400 is configured to read a program in the memory 420 so as to: perform pilot activation detection on each terminal in a first terminal set corresponding to an non-orthogonal multiple access (NOMA) transmission unit block repeatedly until a detection end condition is met, wherein the first terminal set comprises terminals that may transmit uplink data on the NOMA transmission unit block; perform, on the time-frequency resource of the NOMA transmission unit block, channel estimation on each terminal in a second terminal set determined through the pilot activation detection within each repetition period, wherein the second terminal set comprises terminals that have actually transmitted the uplink data on the NOMA transmission unit block, and detect and decode a data channel according to a channel estimation result of each terminal in the second terminal set within each repetition period and an uplink data signal on the time-frequency resource of the NOMA transmission unit block.

The transceiver 410 is configured to receive and transmit data under the control of the processor 400.

The memory 420 is configured to store therein data for the operation of the processor.

In FIG. 4, a bus architecture may include any number of interconnected buses and bridges, specifically, connected by various circuits of one or more processors represented by the processor 400 and the memory represented by the memory 420. The bus architecture may link other various circuits such as a peripheral device, a voltage regulator, a power management circuit, or the like, which are known in the art and not further described herein. A bus interface provides an interface. The transceiver 410 may include a plurality of elements, i.e., including a transmitter and a receiver, providing a unit for communicating with various devices on a transmission medium. The processor 400 takes charge of managing the bus architecture and general processing, and the memory 420 may store the data used when the processor 400 performs operations.

Optionally, the detection end condition includes at least one of the following: that a number of repetition times of the pilot activation detection reaches a threshold number of repetition times; that the second terminal sets determined through the pilot activation detection within at least two repetition periods are the same; and that a relative difference ratio of pilot prior existence probabilities determined by detecting and decoding the data channel within at least two repetition periods is not greater than a predetermined relative difference ratio threshold.

Based on any of the above-mentioned base station embodiments, in the case that the pilot activation is detected on each terminal in the first terminal set corresponding to the NOMA transmission unit block, the processor may be further configured to read the programs in the memory, so as to: perform, based on pilot signal received power, the pilot activation detection on each terminal in the first terminal set corresponding to the NOMA transmission unit block.

Optionally, in the case that the pilot activation detection is performed on each terminal in the first terminal set corresponding to the NOMA transmission unit block, the processor is further configured to read the programs in the memory, so as to: performing LS channel estimation on a pilot signal on the NOMA transmission unit block in a frequency domain, to obtain a frequency domain LS channel estimation value; converting the frequency domain LS channel estimation value to a time domain channel estimation value; determine a detection statistic value and a judgment threshold of interference noise power according to the time domain channel estimation value; and determine the second terminal set according to the detection statistic value and the judgment threshold of the interference noise power.

In the case that the pilot activation detection is performed on each terminal in the first terminal set corresponding to the NOMA transmission unit block, the processor is further configured to read the programs in the memory, so as to: perform, based on a pilot-signal correlation, the pilot activation detection on each terminal in the first terminal set corresponding to the NOMA transmission unit block.

Optionally, in the case that the pilot activation detection is performed on each terminal in the first terminal set corresponding to the NOMA transmission unit block, the processor is further configured to read the programs in the memory, so as to: determine an autocorrelation matrix of a pilot signal on each uplink subcarrier of the time-frequency resource of the NOMA transmission unit block; determine an average value of autocorrelation matrices of pilot signals on all uplink subcarriers of the time-frequency resource of the NOMA transmission unit block; determine a maximum eigenvalue and a minimum eigenvalue of the average value; and determine the second terminal set according to the maximum eigenvalue and the minimum eigenvalue.

Based on any of the above-mentioned base station embodiments, optionally, the terminals in the first terminal set include a terminal of the own cell and a terminal of the adjacent cell.

Persons skilled in the art should understand that the embodiments of the present disclosure can be provided as a method, a system or a computer program product. Therefore, the present disclosure can take the form of a full hardware embodiment, a full software embodiment, or an embodiment with combination of software and hardware aspects. Moreover, the present disclosure can take the form of a computer program product implemented on one or more computer usable storage mediums (including, but not limited to, a magnetic disc memory, CD-ROM, optical storage, etc.) including therein computer usable program codes.

The present disclosure is described with reference to a flow chart and/or a block diagram of the method, device (system) and computer program product according to the embodiment of the present disclosure. It should be understood that each flow in the flow chart, each block in block diagram, and/or a combination of the flows in the flow chart and/or blocks in block diagram can be realized by the computer program instructions. These computer program instructions can be provided to a general computer, a dedicated computer, an embedded processor or a processor of other programmable data processing device to generate a machine, such that the instructions performed by the computer or the processor of other programmable data processing device(s) generate the device for implementing the function designated in one flow or a plurality of flows in the flow chart and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device which implements the function designated in one flow or a plurality of flows in the flow chart and/or a block or a plurality of blocks in the block diagram.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

Although the embodiments of the present disclosure have been discussed, a person of ordinary skills may modify and polish these embodiments with the inventive principle of the present disclosure. Therefore, the claims should be construed as including the embodiments and all modification and polish falling within the scope of the present disclosure.

It is appreciated that a person of ordinary skills may modify and improve the present disclosure without departing from the spirit and principle of the present disclosure. As a result, if those modification and improvement falls within the scope of claims and the equivalence thereof, those modification and improvement fall within the scope of the present disclosure.

What is claimed is:

1. An uplink detection method in a non-orthogonal multiple access (NOMA) system, comprising:
   performing pilot activation detection on each terminal in a first terminal set corresponding to an NOMA transmission unit block repeatedly until a detection end condition is met, wherein the first terminal set comprises terminals that may transmit uplink data on the NOMA transmission unit block, and the NOMA transmission unit block comprises all NOMA basic transmission units occupying a same time-frequency resource in a same NOMA pattern matrix;
   performing, on the time-frequency resource of the NOMA transmission unit block, channel estimation on each terminal in a second terminal set determined through the pilot activation detection within each repetition period, wherein the second terminal set comprises terminals that have actually transmitted the uplink data on the NOMA transmission unit block; and
   detecting and decoding a data channel according to a channel estimation result of each terminal in the second terminal set within each repetition period and an uplink data signal on the time-frequency resource of the NOMA transmission unit block;
   wherein the step of performing pilot activation detection on each terminal in the first terminal set corresponding to an NOMA transmission unit block comprises:
   performing, based on a pilot signal received power or a pilot-signal correlation, the pilot activation detection on each terminal in the first terminal set corresponding to the NOMA transmission unit block;

wherein the performing, based on the pilot signal received power or the pilot-signal correlation, the pilot activation detection on each terminal in the first terminal set corresponding to the NOMA transmission unit block comprises:

performing least squares LS channel estimation on a pilot signal on the NOMA transmission unit block in a frequency domain, to obtain a frequency domain LS channel estimation value; converting the frequency domain LS channel estimation value to a time domain channel estimation value; determining a detection statistic value and a judgment threshold of interference noise power according to the time domain channel estimation value; and determining the second terminal set according to the detection statistic value and the judgment threshold of the interference noise power; or determining an autocorrelation matrix of a pilot signal on each uplink subcarrier of the time-frequency resource of the NOMA transmission unit block; determining an average value of autocorrelation matrices of the pilot signals on all uplink subcarriers of the time-frequency resource of the NOMA transmission unit block; determining a maximum eigenvalue and a minimum eigenvalue of the average value; and determining the second terminal set according to the maximum eigenvalue and the minimum eigenvalue.

2. The method according to claim 1, wherein the detection end condition comprises at least one of:
that a number of repetition times of the pilot activation detection reaches a threshold number of repetition times;
that the second terminal sets determined through the pilot activation detection within at least two repetition periods are the same; and
that a relative difference ratio of pilot prior existence probabilities determined by detecting and decoding the data channel within at least two repetition periods is not greater than a predetermined relative difference ratio threshold.

3. The method according to claim 1, wherein the terminals in the first terminal set comprise a terminal of an own cell and a terminal of an adjacent cell.

4. A base station, comprising a processor, a transceiver and a memory, wherein
the processor is configured to read programs in the memory so as to:
perform pilot activation detection on each terminal in a first terminal set corresponding to an non-orthogonal multiple access (NOMA) transmission unit block repeatedly until a detection end condition is met, wherein the first terminal set comprises terminals that may transmit uplink data on the NOMA transmission unit block,
perform, on a time-frequency resource of the NOMA transmission unit block, channel estimation on each terminal in a second terminal set determined through the pilot activation detection within each repetition period, wherein the second terminal set comprises terminals that have actually transmitted the uplink data on the NOMA transmission unit block, and
detect and decode a data channel according to a channel estimation result of each terminal in the second terminal set within each repetition period and an uplink data signal on the time-frequency resource of the NOMA transmission unit block;

the transceiver is configured to receive and transmit data under the control of the processor; and
the memory is configured to store therein data for the operation of the processor;
wherein in the case that the pilot activation detection is performed on each terminal in the first terminal set corresponding to the NOMA transmission unit block, the processor is further configured to read the programs in the memory, so as to:
perform, based on a pilot signal received power or a pilot-signal correlation, the pilot activation detection on each terminal in the first terminal set corresponding to the NOMA transmission unit block;
wherein in the case that the pilot activation detection is performed on each terminal in the first terminal set corresponding to the NOMA transmission unit block, the processor is configured to read the programs in the memory, so as to:
perform least squares LS channel estimation on a pilot signal on the NOMA transmission unit block in a frequency domain, to obtain a frequency domain LS channel estimation value; convert the frequency domain LS channel estimation value to a time domain channel estimation value; determine a detection statistic value and a judgment threshold of interference noise power according to the time domain channel estimation value; and determine the second terminal set according to the detection statistic value and the judgment threshold of the interference noise power; or
determine an autocorrelation matrix of a pilot signal on each uplink subcarrier of the time-frequency resource of the NOMA transmission unit block; determine an average value of autocorrelation matrices of pilot signals on all uplink subcarriers of the time-frequency resource of the NOMA transmission unit block; determine a maximum eigenvalue and a minimum eigenvalue of the average value; and determine the second terminal set according to the maximum eigenvalue and the minimum eigenvalue.

5. The base station according to claim 4, wherein the detection end condition comprises at least one of:
that a number of repetition times of the pilot activation detection reaches a threshold number of repetition times;
that the second terminal sets determined by through the pilot activation detection within at least two repetition periods are the same; and
that a relative difference ratio of pilot prior existence probabilities determined by detecting and decoding the data channel within at least two repetition periods is not greater than a predetermined relative difference ratio threshold.

6. The base station according to claim 4, wherein the terminals in the first terminal set comprise a terminal of an own cell and a terminal of an adjacent cell.

7. The method according to claim 2, wherein the terminals in the first terminal set comprise a terminal of an own cell and a terminal of an adjacent cell.

8. The base station according to claim 5, wherein the terminals in the first terminal set comprise a terminal of an own cell and a terminal of an adjacent cell.

* * * * *